Feb. 19, 1935.   A. G. WALLS ET AL   1,991,915
MACHINE TOOL HAVING FLUID PRESSURE FEEDS
Filed Aug. 20, 1932    2 Sheets-Sheet 2
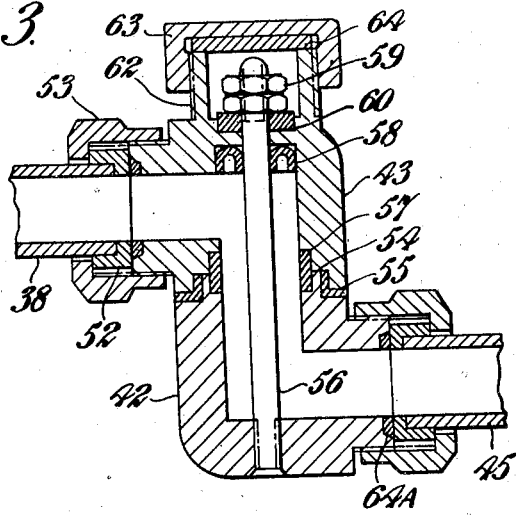
Fig. 3.
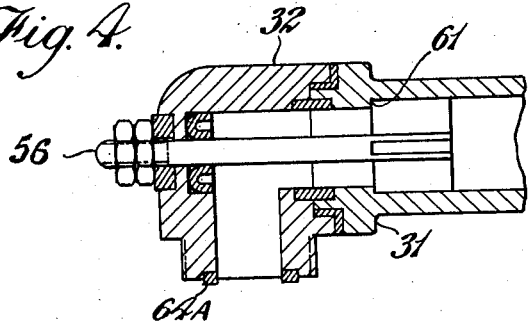
Fig. 4.
Fig. 5.
Fig. 6.
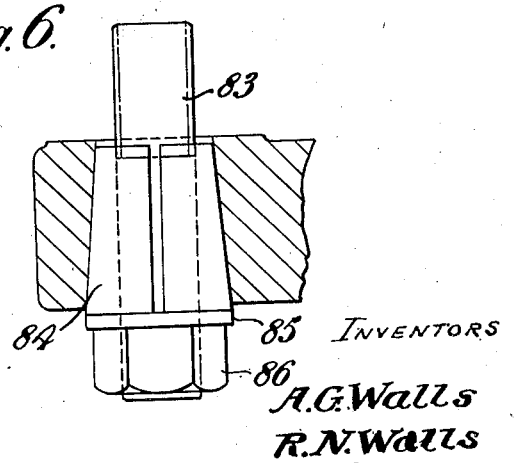
INVENTORS
A. G. Walls
R. N. Walls
by [signature] Atty.

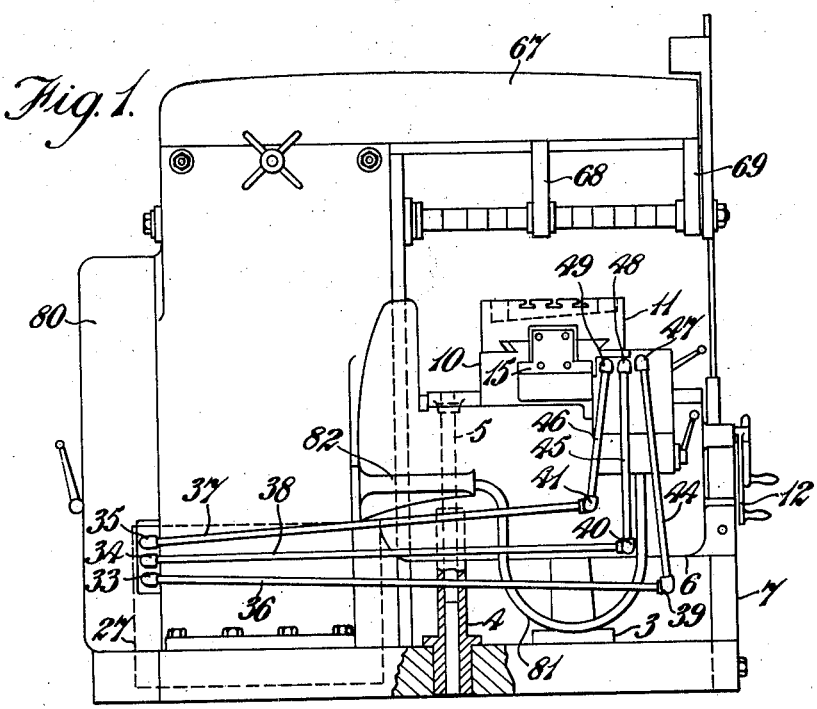

Patented Feb. 19, 1935

1,991,915

UNITED STATES PATENT OFFICE 1,991,915

MACHINE TOOL HAVING FLUID PRESSURE FEEDS

Alexander Groundwater Walls and Rognvald Nicholas Walls, Ashton on Mersey, England Application August 20, 1932, Serial No. 629,680 In Great Britain August 4, 1931

5 Claims. (Cl. 90—21.5)

Machine tools with fluid pressure feeds are well known and when high pressures and regular feeds are required, liquids—usually oil—have been used. Such fluid pressure feeds no matter what liquid is used are generally known to those skilled in the art, as hydraulic feeds.

Our invention relates to such liquid pressure, or so called hydraulic, feeds and has for its object the application of such feeds to mechanism in which a straight line hydraulic motor such as a cylinder and piston, operates a slide, the position of the valve element, controlling reversal or change of speed, of which, in relation to the source of power, is variable.

Flexible pipes, telescopic pipes, rack and pinion mechanism, among other means have been used to connect a variable position slide with a fixed position source of power, but have failed to satisfy requirements in certain types of tools and in such known applications, the valve element has occupied a fixed position in relation to the source of power.

A good example of a machine tool to which our invention is particularly applicable is a horizontal spindle knee type milling machine, and we will describe it more particularly as applied to that type of machine tool, although its application is not confined to such machines.

Horizontal knee type milling machines usually have a body or column in which is located the cutter spindle capable of being driven at a number of different speeds through suitable gearing. On the column the knee slides vertically. On the knee the saddle or cross slide travels horizontally in a direction parallel to the axis of the spindle, this movement being usually referred to by those skilled in the art as the "cross" or "transverse" movement.

On the saddle is mounted the work table, capable of sliding horizontally in a direction at right angles to the spindle axis and as the early milling cutters were usually considered as circular saws, and as work is usually machined in this direction, this movement has generally been called "longitudinal".

We will describe our invention as applied to the longitudinal or table slide, although it is applicable to slides in any direction.

According to our invention the table is provided at one end with a downward projection, to which we attach the outer end of a piston rod which passes through an oil tight aperture into a cylinder.

The cylinder is fixed to the upper side of the cross slide and pressure oil introduced at one end of the cylinder, moves the piston and therefore the table, in a direction away from the inlet. On the other side of the piston, exhaust oil, also under pressure, leaves by the cylinder outlet, and the table is thus under control both ways in a manner approaching that of a table operated by a screw and nut.

Built into the saddle or cross slide, we mount a valve element comprising the valve gear necessary for supplying oil to the cylinder at a rate to move the piston fast or slow, and capable of changing the direction of the flow or of stopping the flow.

Pressure oil is supplied from a suitable source of power such as an accumulator or a pump or pumps on an immovable part of the machine by a pipe, hereinafter called the pump pipe, having a swivel joint on the source of power, hereinafter called the initial joint, another joint hereinafter called the elbow joint connects the pump pipe with a pipe hereinafter called the valve pipe, and a third joint hereinafter called the terminal joint connects the valve pipe to the valve element.

Such joints must be of a form to withstand high pressures without leaking and in one form we oppose two faces, one having a spigot and the other a recess to locate the bores co-axially one with the other. Inside the bores we locate a tubular elastic fitting, such as leather or the like, which is expanded by the internal oil pressure and thus forms a non-leaking joint. The two faces are held together by a central bolt which is fast in one member, and passes out through the other member co-axially with the bores.

Leaking between the bolt and the hole it passes through is prevented by an elastic pressure fitting such as a U leather or the like, held tight against the bolt and the bore by the internal pressure.

Outside the joint the bolt is provided with a nut to hold the members together against the end pressure which tends to force them apart.

In another construction the U leather around the bolt may be omitted and the tightening nuts contained within a recess which is in turn sealed with an outer cap.

For purposes of easy movement and lubrication we clothe the meeting faces of the members and of the nut with fibre or other suitable material.

Several pipes as high pressure for feed, low pressure for quick travel, exhaust for return of oil and the like, may be used to communicate between the fixed position supply and the variable position valve element.

The various pump pipes swing up and down about fixed initial joints on the source of power to agree with the vertical movement of the knee and the valve pipes swing transversely about the elbow joints to agree with the transverse movement of the saddle to which they are connected by the terminal joints and pressure oil is conveyed without leakage from a fixed source of power to a valve element whose position in relation to the source of power is variable.

As an alternative form of joint we may use a ball and socket type fitted with the equivalent of a hydraulic leather, in which the pressure of the oil tends to keep the joint liquid tight while being free to rotary movement.

The valve element comprises a block having ducts for the passage of oil interrupted by cylindrical sliding valves capable of closing or opening certain ducts as controlled by "dogs" on the table, and to ensure substantially instantaneous operation of such sliding valves even when the worktable is travelling very slowly we arrange a load-and-fire spring mechanism in which the travel of the table first charges a spring without moving the valve and then releases the charged spring to shoot the valve quickly to its predetermined new position.

According to our invention as used on a knee type milling machine we use the hydraulic power to substantially counterbalance the weight of the knee and the parts supported by the knee.

For this purpose we mount a vertical cylinder on the base of the machine encircling a piston attached to the knee. This cylinder and piston are not of sufficient diameter to overcome the weight of the vertically moving parts, but are of considerable assistance when the knee is raised by the usual screw mechanism.

The hydraulic power may be left continually on the knee cylinder or may be used only while lifting and is intended to obviate the excessive slackening of the knee slide when elevating or lowering, which most operators consider necessary.

For changing the spindle speeds we employ an arrangement of sliding gears operating from a constant speed shaft to the variable speed spindle and to prevent "crashing" of gears during the changes we arrange a locking device which prevents the changing of gears when the constant speed shaft is running at a dangerous speed.

It is usual on such machines to change the positions of wheels with the machine running slowly by its own momentum after the power has been cut off, which sometimes necessitates several momentary starts and stoppages as the gears do not always stop in a position for engaging.

In our invention the gears are moved by spring levers which apply power to the wheel but give way if the wheel should be actually stopped in a position in which it cannot engage. Such spring pressure remains on the wheel and when the machine is put in motion the wheel shoots into engagement immediately the teeth assume a position to engage, which naturally occurs before a dangerous speed is reached.

It is therefore possible to adjust the mechanism to the desired position with the gearing absolutely stopped, which is a great convenience to the operator.

In one type of our gear arrangement we control our spring levers by cams, so arranged that by rotating a dial on which the spindle speeds are arranged in progressive sequence, until the desired speed is opposite an indicator, the change will be made automatically immediately the machine is started.

The mechanism is so arranged that the dial may be moved either backwards or forwards whichever movement may be most convenient without endangering parts of the mechanism.

Hydraulically fed machines are generally accepted as being machines of high production and as such must have every possible convenience for minimizing the time occupied in changing from one type of work to another.

In our invention the machine is driven preferably by a self contained motor and the starting and stopping of the machine are controlled by a switch on the front of the saddle the spindle speeds are changed by the movement of a single lever without the necessity of "inching" as hereinbefore described, and the bracing of overarm and arbor support to knee is accomplished in minimum time by a brace carried permanently by the overarm.

On the outer end of the overarm we pivot a female slide containing a male sliding bar and when the machine is required to be "open" as in changing cutters or for the passage of an extra wide workpiece the sliding bar is pushed up and the pivoted slide partially rotates on its pivot, in which position the brace is entirely out of the way. To lock the brace the pivoted slide is partly rotated in the opposite direction and the bar slid down till it encounters a rocking bracket on the knee. Two locking levers are then tightened by a quarter turn and the overarm and arbor support are securely braced to the knee.

The brace is not at any position parallel to the vertical fitting of the knee and in no way acts as a guide but forms a quick and efficient means of locking the overarm to the knee and so eliminates chatter and makes possible the high production which should accrue from the use of hydraulic feeds.

The accompanying drawings illustrate by way of example constructions of apparatus according to our invention.

Figure 1 is a side view of a horizontal spindle knee type milling machine.

Figure 2 is a front view of the same machine.

Figure 3 is a sectional view of a pressure tight joint used in our invention for flow in substantially the same plane.

Figure 4 is a sectional view of a pressure tight joint used in our invention for flow at right angles.

Figure 5 shows the anchorage of the bolt used in Figure 4.

Figure 6 shows the construction of adjustable-fitting pivots for the brace.

Like numerals are used to denote like parts in the various figures.

In Figures 1 and 2 the column 1 of a knee type milling machine is securely bolted to a base 2 which also supports pedestal 3 of the nut of the raising screw, and the hydraulic cylinder 4 in which slides the piston 5 for the purpose of counterbalancing the weight of the knee 6 and the parts it carries. The base 2 at its front end carries an upright guide 7 in this illustration of a rectangular form and having guiding surfaces on two sides only at 8 and 9 which guide 7 is additional to the usual guiding surfaces on the column as far as stresses longitudinal to the table are concerned.

In addition to the knee 6 giving vertical movement the machine is shown fitted with a saddle 10 for transverse movement and a table 11 for the main or longitudinal movement.

The knee 6 is moved vertically by the usual screw acting in a nut on pedestal 3 and controlled by handle 12 and the saddle is moved to and from the column by hand wheel 14 having a screw journalled in the knee and engaging a nut carried on the saddle.

The longitudinal movement of table 11 is effected hydraulically by a cylinder carried by blocks 15 on the saddle and containing a piston on the end of piston rod 16 communicating with table 11 at its extension 17.

Table 11 on its front face has two T slots 18 and 19 carrying trip dogs as 20 and 21 serving to change slow feed into quick power traverse or vice versa through engagement with a corresponding projection at 22 of the vertically slidable and partially rotatable element which in turn operates the sliding hydraulic control valves.

Control projection 22 is only affected by trip dogs as 21 in T slot 19 which may carry any suitable number of dogs some of which lift up and others push down the projection 22 and only when the table is travelling in the direction B to A.

Trip dogs 23, 24 encounter projection 25 and partially rotate the member carrying the projections and serve to reverse the motion of the table. Dog 24 only operates when the table is travelling as before mentioned in the direction B to A.

When the table is travelling in the direction A to B trip dogs as 20 carried in T slot 18 encounter projection 26 to change the speed and dog 23 reverses the direction by encountering the opposite end of projection 25.

Thus the sliding up and down of the apparatus 22,—26 operates changes of speed of travel and a partial rotation either in one direction or the other operates the reversal of direction travelled.

Such table control—by two lines of dogs and a sliding up and down and partial rotation of a longitudinally stationary member—is well known, and forms no part of our invention.

For convenience of hand control this mechanism is fitted with a "joy stick" lever on a spherical fulcrum and four positions of which agree with feed left, quick power left, reverse left to right, quick power right, feed right, reverse right to left.

In addition to feed and quick power dogs as 21 T slots 18, 19 may carry stop dogs engaging a separate stop plunger for positively cutting off pressure fluid.

The lower part of column 1 is widened out to contain a driving motor from which gearing means such as a chain transmits power to the first shaft of the change speed gear box contained in the upper part of the column for obtaining the various necessary spindle speeds.

In the case of machines having a pump or pumps for generating their own hydraulic power the lower part of the column also contains the tank or reservoir for the oil and a small motor for driving the pumps.

In Figure 1 27 is the tank into which pass three rigid pipes 28, 29, 30 communicating on their inner end with high pressure pump for feed with low pressure high volume pump for quick power traverse and with main reserve of oil.

These rigid pipes 28, 29, 30 terminate each in one half of a pressure tight joint as shown at 31 Figure 4 agreeing with a right angle half 32 thus forming initial joints 33, 34, 35 of the connection from a fixed position supply to a variable position valve element. Long pipes 36, 37, 38 carry fluid to the elbow joints 39, 40, 41 composed as shown in Figure 3 of two right angle halves 42, 43 and acting so that fluid flows in substantially the same plane but is capable of taking any direction round a circle lying in that plane.

From elbow joints 39, 40, 41 fluid is carried through short pipes 44, 45, 46 to terminal joints 47, 48, 49, and through three rigid pipes only one 50 of which is visible in the illustrations into the valve element 51 carried on saddle 10.

Figure 3 illustrates the construction of the pressure tight joints. Pipe 38 is fitted on its end with an integral enlargement 52 providing on one side a large surface to abut against the joint 43 and on the other side a shoulder, engaging the usual coupling nut 53. Similarly the other half 42 of the elbow joint is fitted with pipe 45 and its coupling arrangement. Joint half 42 on its actual joint face is formed with a spigot 54 surrounded with an L shaped ring 55 of fibre or other suitable material to provide a sweetly working surface for operating against the recess and face of the opposing joint half 43. Half 42 is also provided with a rod 56 passing axially through the joint and serving to hold the swivelling joint faces together against the high pressure fluid. At the point of meeting and for some distance on either side the joint halves are recessed to receive a tubular liner 57 of leather, fibre, or other suitable expansible material which is held tight against the wall of the bore by the fluid pressure. Rod 56 is anchored pressure tight in half 42 of the joint but passes out through a hole in the opposing half 43, and forms with spigot 54 the pivot around which half 43 swings. It is therefore necessary to prevent leakage between rod 56 and its hole.

For this we provide a U leather 58 which the pressure forces tight against the bore on one hand and against the rod 56 on the other.

Rod 56 outside the joint is fitted with adjusting nuts 59 to pull halves 42, 43, together and a washer 60 of fibre or other suitable material is interposed between the metal nuts and the metal joint to secure suitable rubbing surfaces.

In Figure 4 joint half 32 is the equivalent of joint half 43 in Figure 3 and the end of pipe 31 is formed to act as joint half 42. In Figure 4 the rod 56 cannot be anchored as in joint 42 but is formed with an enlarged end the shoulder 61 of which abuts against the shoulder in the pipe and acts as anchorage. To allow oil to pass freely the enlarged end 59 of rod 56 is cut away leaving only three narrow fins of material as shown in Figure 5.

As an alternative to the U leather 58 Figure 3—or in addition thereto—as a means for stopping leakage of fluid around the rod 56 we surround the nuts 59 with a recessed extension 62 of joint half 43. Extension 62 is screwed on its outside to receive a sealing cap 63 provided inside with an elastic washer 64. The joint halves where coupled to the pipe ends are formed with a recess to receive an elastic washer 64A which is subjected to considerable compression before the pipe and joint faces meet metal to metal which preferably they must do in order to secure rigidity.

The valve element 51 is built integrally into the saddle 10 of the machine and by means of the six pipes and initial, elbow, and terminal joints is supplied with pressure fluid at any position vertically or transversely it may be moved to form a fixed source of power as in the case described as pumps in tank 27.

Obviously if desired other valve elements might be fitted to operate with dogs travelling in other directions and other types of machine tools might be fitted with similar arrangements. A horizontal spindle milling machine is described by way of example.

For starting, stopping and reversing the spindle of the machine we mount a rocking switch 65 underneath the valve element in which the vertical position of the handle 66 indicates the stop or off position while the dotted handles on either side represent the "on" position clockwise on the reverse position anti-clockwise.

To support the long cutter arbor free from chatter we mount on top of column 1 an overarm 67 from which depend arbor supports 68 and 69.

On the end of overarm 67 we pivot at 70 a swinging brace socket 71 fitted to accommodate a sliding brace 72 connecting with a second sliding fitting 73 pivoted at 74 on the knee 6.

In operation the brace 72 free to swing around pivot 70 on the overarm and to slide in socket 71 is swung and slid towards fitting 73 on the knee 6, and by entering the slide of fitting 73 has brought the bolt 75 of socket 71 into a slot in the outer arbor support 69. Locking lever 76 simultaneously locks angle strip 77 tight on brace 72 and socket 71 to arbor support 69 and therefore overarm 67. Locking lever 78 simultaneously locks brace 72 to fitting 73 and fitting 73 to knee 6.

To change cutters or provide space for wide workpieces passing through the operation is reversed and the loosened brace is pushed up through socket 71 till half its length is beyond pivot 70 when by swinging brace 72 to a horizontal position the arbor supports 68, 69 may be removed from the overarm and the brace 72 will be sufficiently out of balance toward the left in Figure 2 to maintain itself against the stop 79.

All the electrical control gear is contained within the door 80 at the back of the column so that no floor space or wall space is taken up with the usual control panel and immediately door 80 is opened all electrical power is cut off from the machine.

Cables from hand control switch 65 are carried to the interior of the machine through flexible metallic hose 81 and rigid fitting 82.

For convenience in manipulation the pivots 70 and 74 are kept adjusted to such a tightness that it is not necessary to further tighten them when operating the brace. These pivots are formed as a parallel stud 83 Figure 6 surrounded by a split cone 84 in a conical hole in the pivotad member and held in my a keyed washer 85 and nut 86.

What we claim is:—

1. In a milling machine, a base, a work positioning element movable relative to the base, a table movable relative to the element, a hydraulic motor for operating the table relative to the element, a valve carried by the element for controlling the hydraulic motor, fluid pressure means fixed with respect to the base, and a communicating conduit intermediate the fluid pressure means and the valve, said conduit being made up of rigid pipe sections and a joint member connecting the adjacent ends of the pipe sections to permit uninterrupted fluid flow therethrough, said joint member permitting relative movement of the rigid pipe sections to compensate for the relative movement between the valve and fluid pressure means without interfering with fluid flow.

2. In a milling machine, a base, a work positioning element movable relative to the base, a work supporting table movable relative to the element, a hydraulic motor carried by the element for operating the table, a valve carried by the element for controlling the motor, a fluid pressure means fixed with respect to the base, a conduit communication between the fluid pressure means and the valve, said conduit communication being made up of rigid pipe sections, and a jointing member intermediate the adjacent ends of the rigid pipe sections to provide uninterrupted fluid flow through the conduit while permitting relative movement of such pipe sections to compensate for the relative movement between the valve and fluid pressure means without interfering with the current flow, said fluid conduit comprising rigid pipe sections, a jointing connection between the adjacent ends of the pipe sections to permit relative movement between the pipe sections while maintaining fluid flow, and jointing connections between one end of the conduit and the valve and between the other end of the conduit and the fluid pressure means.

3. In a milling machine, a base, a work positioning element movable relative to the base, a table carried by and movable relative to the element, a hydraulic motor carried by the element for operating the table, a valve carried by the element for controlling the hydraulic motor, a fluid pressure means fixed with respect to the base, a fluid conduit intermediate the fluid pressure means and valve and compensating for relative movements between the valve and fluid pressure means without interfering with fluid flow, and fluid pressure means for substantially counterbalancing movable parts, said fluid conduit comprising rigid pipe sections, a jointing connection between the adjacent ends of the pipe sections to permit relative movement between the pipe sections while maintaining fluid flow, and jointing connections between one end of the conduit and the valve and between the other end of the conduit and the fluid pressure means.

4. In a milling machine, a fixed column, a saddle movable relative to the column, a table movable relative to the saddle, fluid pressure means fixed with respect to the column, a hydraulic motor including a valve carried by the saddle, means establishing communication between the fluid pressure means and valve and formed to compensate for relative movements between the valve and fluid pressure means, said communicating means being made up of a plurality of rigid pipe sections having a terminal jointing connection with the fluid pressure means, a terminal jointing connection with the valve, and an intermediate jointing connection between the adjacent ends of the rigid pipe sections, said intermediate jointing connection permitting uninterrupted relative angular movement between the pipe sections, and means carried by the table for automatically controlling the valve.

5. In a milling machine, a fixed column, a saddle movable relative to the column, a table movable relative to the saddle, fluid pressure means fixed with respect to the column, a hydraulic motor including a valve carried by the saddle, means establishing communication between the fluid pressure means and valve and formed to compensate for relative movements between the valve and fluid pressure means, said communicating means being made up of a plurality of rigid pipe sections having a terminal jointing connection with the fluid pressure means, a terminal jointing connection with the valve, and an intermediate jointing connection between the adjacent ends of the rigid pipe sections, said intermediate jointing connection permitting uninterrupted relative angular movement between the pipe sections, and manually adjustable means carried by the table for automatically controlling the valve.

ALEXANDER GROUNDWATER WALLS.
ROGNVALD NICHOLAS WALLS.